United States Patent [19]
Deal et al.

[11] 4,128,160
[45] Dec. 5, 1978

[54] LEAK FREE HOUSING FOR VERTICAL SCREW CONVEYOR

[75] Inventors: Douglas O. Deal, Bellevue; Robert C. Morley, Sandusky, both of Ohio

[73] Assignee: Sam Stein Associates, Inc., Sandusky, Ohio

[21] Appl. No.: 817,714

[22] Filed: Jul. 21, 1977

[51] Int. Cl.² .............................................. B65G 65/46
[52] U.S. Cl. ................................... 198/657; 138/163; 198/671
[58] Field of Search ............... 198/657, 671, 558, 548; 138/163

[56] References Cited

U.S. PATENT DOCUMENTS

| | | | |
|---|---|---|---|
| 275,153 | 4/1883 | Craik | 198/548 |
| 1,030,298 | 6/1912 | Haines | 138/163 |
| 3,197,016 | 7/1965 | Jones | 198/671 |
| 3,765,547 | 10/1973 | Shivvers | 198/657 |

FOREIGN PATENT DOCUMENTS

503979  6/1953  Belgium ................................. 138/163

*Primary Examiner*—Robert I. Smith
*Attorney, Agent, or Firm*—Baldwin, Egan, Walling & Fetzer

[57] ABSTRACT

A vertical joint structure is shown extending longitudinally of a generally cylindrical housing encasing a screw conveyor for a breading machine or the like. The housing comprises two generally C-shape half portions formed of sheet metal and assembled by means of a novel joint structure along two longitudinal zones diametrically opposite in the housing. One half portion is fixed in the machine and the other half portion is movable toward and away from a tight fit of the joint structure with the fixed half portion. The distal edges of the movable C-shape half portion extend a short distance beyond a diameter of the housing at approximately a right angle to that diameter and are there bent downwardly and outwardly at an acute angle to a zone just at, or a little beyond, that diameter and there bent outwardly approximately radially of the cylindrical housing. This forms a first linear sealing surface at the acute angle portion. The distal edges of the fixed C-shape half portion approach the first linear sealing surface outside thereof and parallel to the same acute angle to a zone close to the first mentioned zone and are there bent outwardly parallel to the previously mentioned radially extending portions of the movable half portions. This forms a second linear sealing surface parallel to the first linear sealing surface. An arrangement is provided to clamp the two sealing surfaces tightly together.

8 Claims, 12 Drawing Figures

LEAK FREE HOUSING FOR VERTICAL SCREW CONVEYOR

BACKGROUND OF THE INVENTION

The use of screw conveyors for elevating dry granular or powdery substance from one level to another is well known for many applications. The screw construction usually consists of a central rigid rotating shaft with helical flighting strips welded thereto, with shaft bearings suitably mounted at the upper and lower extremities of the shaft, and the whole enclosed in a usually cylindrical housing which is in reasonably close proximity to the outer edge of the helical flighting strips. An inlet opening is provided in one side of the housing near the lower end of the assembly, and an outlet opening is provided near the top. The details of flighting pitch, numbers of flights, screw rotating speed, angle of inclination of the shaft, and the like, may be varied considerably and are unimportant to this disclosure.

In many applications, the screw conveyor housing may be an integral pipe, with no joints except those necessary for fabrication and erection. In some applications, however, the housing must be opened at least daily for inspection and thorough cleaning. One such application is on large breading machines which coat food products with breading material. These machines supply a large excess of breading material around the pieces to be coated, thus insuring full coating of the pieces, and thus requiring that the excess be returned to an elevated hopper for re-use. A vertical or nearly vertical screw conveyor performs the elevating function on the excess breading material.

When a vertical screw conveyor is used on a food processing machine as above, government regulations require that it be cleaned after each day's operation, and all internal surfaces must be exposed for visual inspection. This requires longitudinal joints in the housing to permit opening of about fifty percent of the housing circumference, and transverse joints at top and bottom of the removable section. These joints are the focus of this invention.

The manufacturer of breading machines, who seldom has a production run exceeding 10 machines at one time, and usually works with stainless steel only, must keep his construction cost as low as possible, therefore his fabrication technology for these joints is pretty much limited to simple sheet metal technique such as bending, punching, and welding. The purchasers of these machines who must pay a high dollar figure for them due to short production runs, understandably object when the vertical conveyor joints leak expensive breading onto the floor, yet they will also object to additional cost for leak-proof joints.

In prior art practice, the longitudinal joints of such a housing in food machines are most frequently in a plane which also contains the rotating axis of the screw. An outwardly extending flange on each side of each housing half is formed to lie in the above plane, and various clamping or bolting arrangements are used to hold the flanges together. One side may be hinged to permit the movable housing half to swing open. Some modifications may be made to this arrangement, but the sealing joint remains essentially the same, two planar strips in the same plane which must be well mated to seal, and are held in fixed relation by a piano type hinge or by a multitude of clamps or bolts.

These present joint configurations are frequently less than satisfactory for a number of reasons. Piano hinges are unsanitary, are subject to unadjustable wear, and are easily warped to negate tight closure. The requirement for many clamps means the joint is inherently leaky, and will leak unless all clamps are perfectly adjusted. Joints using a multitude of loose bolts are abhorrent to the purchaser because it is axiomatic that totally removable components will be lost during cleanup. When joint members begin to degrade after use, breading losses become quite expensive both in dollar value of the breading and in frequent floor cleaning operations necessary. Gasketed joints are discouraged by government regulatory agencies because of the inherent porosity of most suitable gasket materials, and the danger of loose gasket pieces entering the food product. Machined joints of heavy material are prohibitively expensive. Thus, it may be seen that a more reliable yet still economical longitudinal joint would be appreciated by the users of large breading machines and possibly by other machine users.

An object of this invention is to provide a simple, economical, rugged, reliable, sanitary and exceptionally tight longitudinal joint in the housing for openable vertical screw conveyors, in order to eliminate the problems discussed above.

Figure 1:
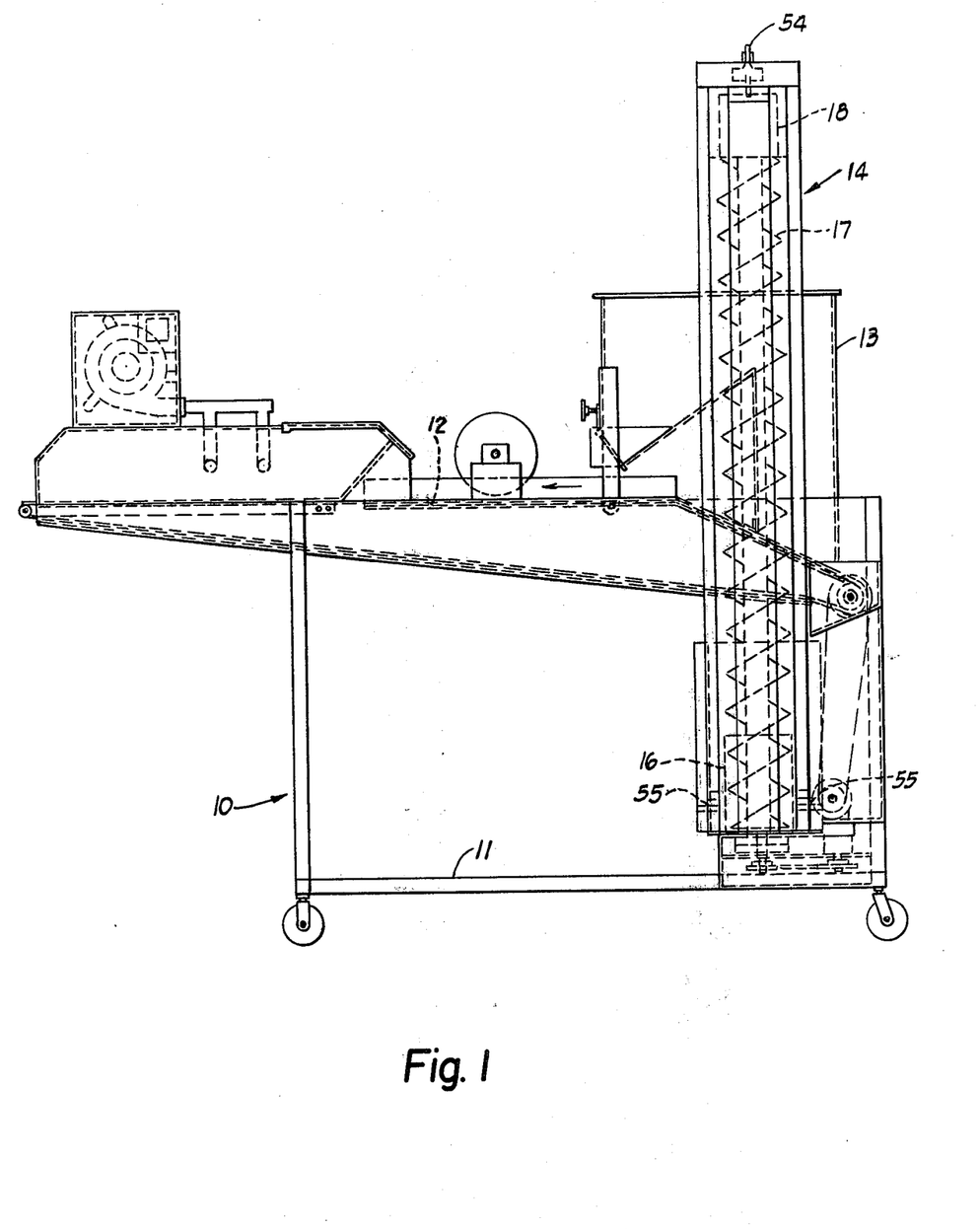
FIG. 1 is a side elevational view of one type of breading machine equipped with a vertical screw conveyor.
Figure 2:
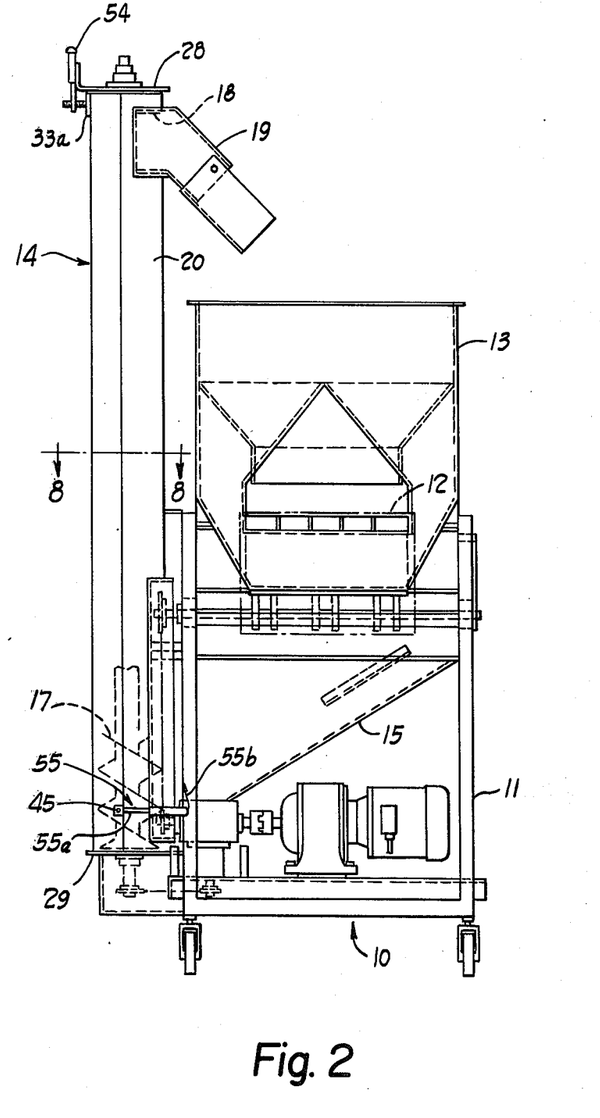
FIG. 2 is a right end elevational view of the first embodiment of FIG. 1.

Referring to the drawings, FIGS. 1 and 2 show a typical breading machine 10, on which the essential parts are the frame 11, the product belt 12 traveling in the direction of the arrow, the feed hopper 13 and the vertical conveyor screw assembly housing 14. The configuration of other breading machines can differ widely in every detail from that shown, but the generally vertical conveyor arrangement is common. The term "generally vertical" in the claim includes a housing tilted as much as 45° from the vertical. When the excess breading material has been removed from the proximity of the food pieces it is used to coat, this excess eventually is returned via a chute or duct 15 to the side of the bottom end of the vertical screw assembly housing 14. An opening 16 in one side of the housing near the bottom of the housing 14 permits the breading material to enter the housing. A drive arrangement rotates the screw 17 inside the vertical screw housing 14 in the proper direction and at the proper speed to lift the breading material to another opening 18 in the side of the housing near the top of the screw assembly 14. A chute 19 directs the breading material to the feed hopper 13, whence the breading material may be reused.

Figure 3:
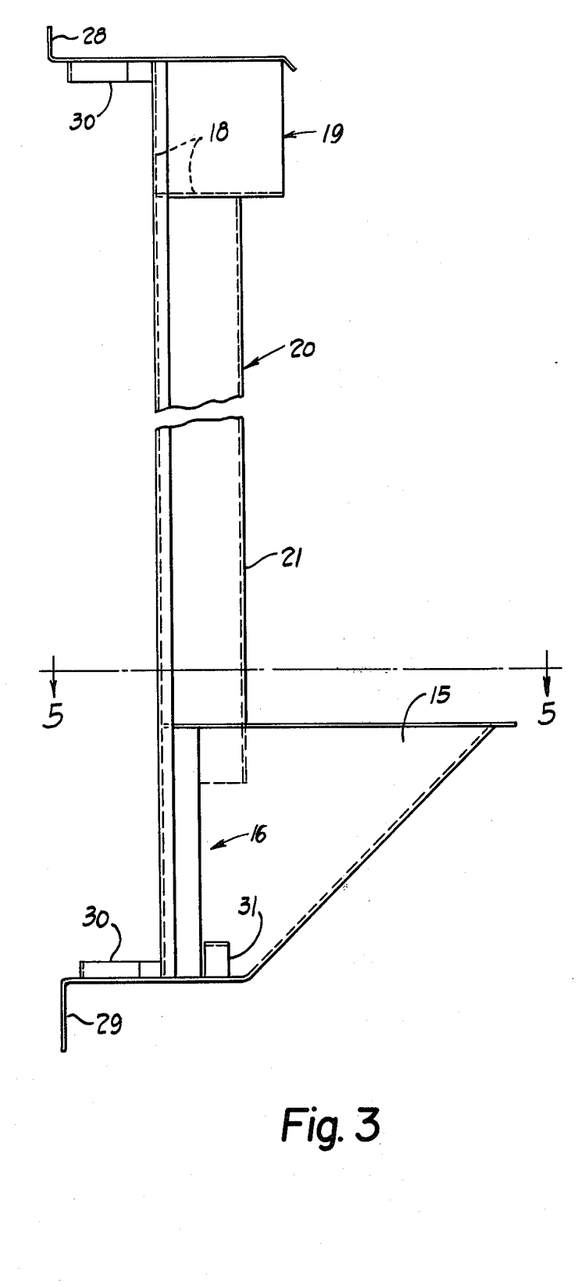
FIG. 3 is an elevational view of the fixed half of the first embodiment of the vertical screw housing viewed from the same position as FIG. 2.
Figure 4:
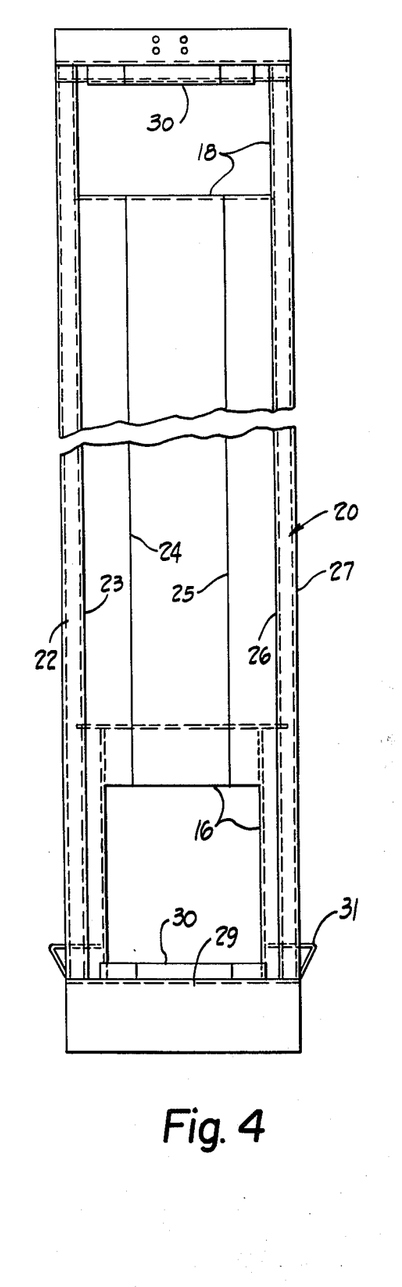
FIG. 4 is an elevational view taken at the left side of FIG. 3.
Figures 5, 6, 6A:
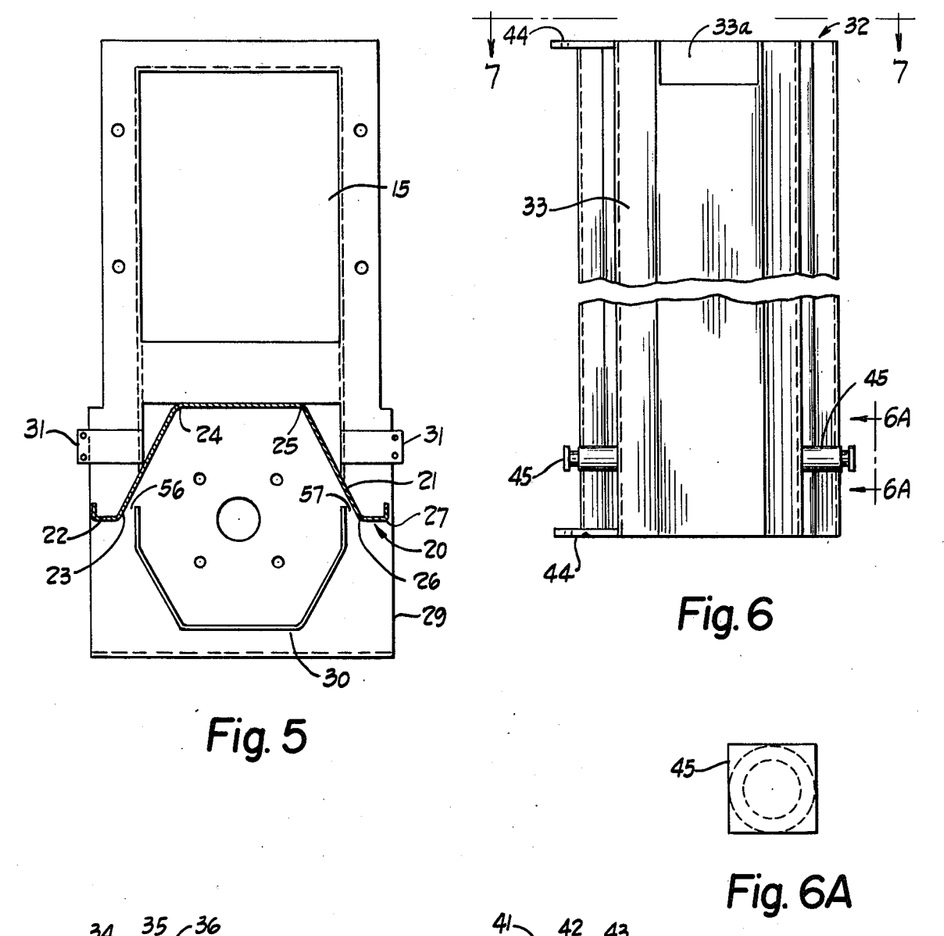
FIG. 5 is a cross-sectional view taken along the line 5—5 in FIG. 3.
FIG. 6 is a side elevation view of the movable half section of the vertical screw housing, taken from the left-hand side of FIG. 2.
FIG. 6A is a fragmental end view taken along line 6A—6A of FIG. 6.

Referring to FIGS. 3, 4, 5, the construction of the fixed section 20 of the vertical screw housing is shown. The half tubing portion 21 of the housing 20 is formed from flat sheet metal, preferably stainless steel, in the present embodiment 14 gauge, with lower inlet opening 16 and upper outlet opening 18 cut out before bending. Six parallel longitudinal bends at 22, 23, 24, 25, 26 and 27 are accurately made to produce the cross sectional view shown in FIG. 5. A top bearing plate 28 with its holes and a bottom bearing plate 29 with its holes are then welded to their respective ends of the tubing portion 21. Bent strips 30 which will be described later are then welded into proper place on plates 28 and 29, conforming to the position of the parts shown in FIG. 5. The addition of the lower chute 15, the upper chute 19, and clamp mounting brackets 31 complete this portion of the vertical screw housing.

Figure 7:
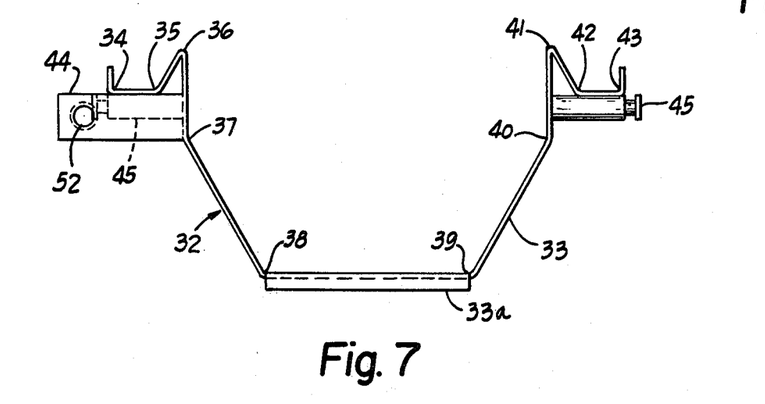
FIG. 7 is a top plan view of FIG. 6.

FIGS. 6 and 7 illustrate the construction of the movable section 32 of the vertical screw housing. A flat rectangular sheet 33 of metal, preferably stainless steel, in the present embodiment 16 gauge, is accurately bent at ten places designated 34 to 43 so that all bends are parallel and in a longitudinal direction, as seen in FIG. 6. The addition of a stiffener plate 33A at the top of the housing as seen in FIGS. 2 and 7, two hinge ears 44, top and bottom of the housing as seen in FIG. 6, with their holes and two clamp pins 45, welded to sheet 33, complete the fabrication of this part.

It will thus be seen that applicant has provided a generally vertical joint structure extending longitudinally of the housing enclosing a generally vertical screw conveyor having an axial driving shaft forming part of a larger machine. The housing comprises a generally cylindrical housing composed of two hollow half portions, each generally C-shape in section, with said half portions assembled with their open sides mutually meeting and joining along two longitudinal zones diametrically opposite in said housing and parallel to the axis of the conveyor shaft to form generally a cylinder whose axis coincides with the drive shaft axis of the conveyor. The housing comprises half portions consisting of formed sheet metal closed at the top and bottom by flat plates. Each of the longitudinal joints comprises a first half portion having a generally planar portion at each terminal edge of the C-shape and parallel to the driving axis and extending a short, predetermined distance beyond a diameter of the housing and there bent downwardly and outwardly at an acute angle extending linearly to approximately the diameter of the housing thus forming a first linear sealing surface, and there bent radially outwardly at an obtuse angle for a short distance. A second half portion of the housing comprises at each terminal edge of the C-shape, a linear portion extending at the above-mentioned acute angle to a zone approximately on the diameter of the housing and outside of the first linear sealing surface, thus forming a second linear sealing surface. This second half portion is then bent radially outwardly on opposite sides of the housing at an obtuse angle for a short distance. In a preferred form of the invention, these latter radially extending portions of both half portions of the housing are then bent at 90° upwardly for a very short distance to give another stiffening bend at that zone.

Figure 8:
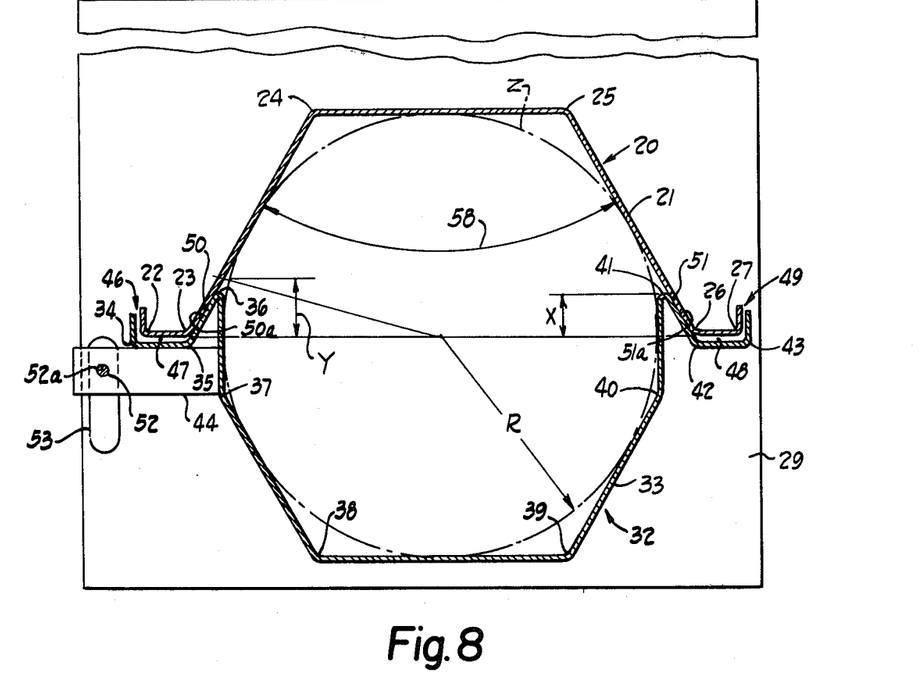
FIG. 8 is a partial horizontal sectional view of the two housing halves in closed relation before clamping the joints, taken along line 8—8 in FIG. 2 without conveyor 17.

FIG. 8 illustrates how the longitudinal joints appear when the movable section 32 of the vertical screw housing is first moved into closed position, before being clamped into position. One planar sealing surface 51 between bends 41 and 42 on movable section 32 is in light contact with a portion of one planar sealing surface designated 51a between bends 25 and 26 on fixed section 20. Similarly, one planar sealing surface 50 between bends 35 and 36 on movable section 32 is in light contact with a portion of one planar sealing surface designated 50a between bends 23 and 24 on fixed section 20. There is a definite gap between other planar surfaces of the joints, the gaps being indicated at 46, 47, 48, 49. These gaps are a relatively small fraction of an inch wide, being about the metal thickness of sheets 21 or 33, or approximately one-sixteenth of an inch.

Figure 9:
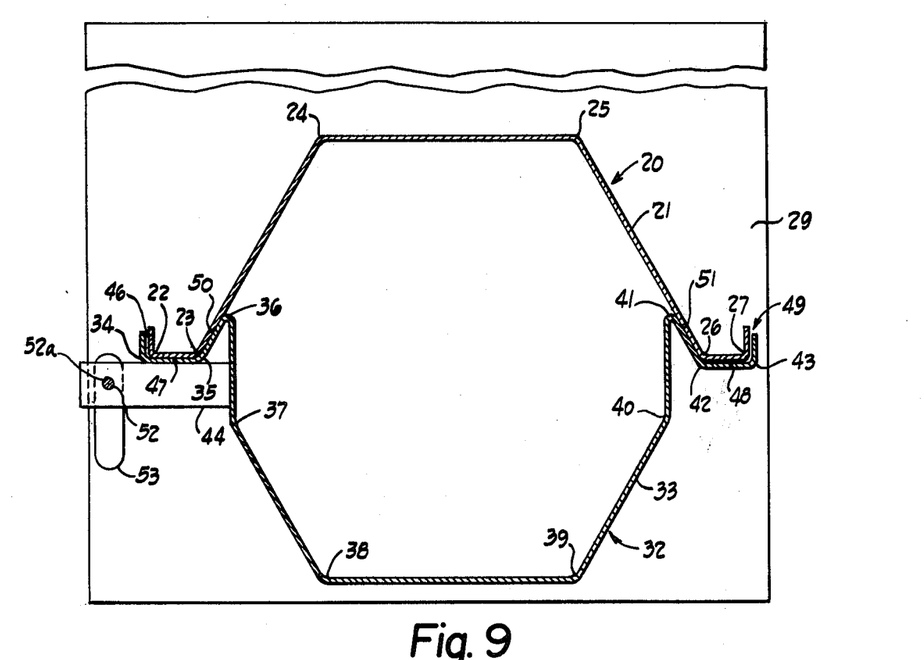
FIG. 9 is the same sectional view as FIG. 8 after clamping the joint.

FIG. 9 illustrates how the longitudinal joints appear after the clamping action which will be described later. The movable housing portion 32 has been wedged further into the fixed portion 20 and the gaps 46, 47, 48 49 have all closed at least partially. This action is possible because sheet 33 is not absolutely rigid between bends 36 and 38, nor between bends 39 and 41, therefore bends 36 and 41 actually approach each other slightly during clamping of the two housing sections. It will be noted that when bends 36 and 41 approach each other, the relationship between touching planar surfaces at 50 and 51 will theoretically change, so that the lines 50 and 51 in this view will tend to become thin wedge shaped gaps with their wider openings closest to bends 36 and 41. In actuality, the transverse flexibility in the plane of the drawing of sheet 33 between bends 35 and 36, and between bends 41 and 42 usually eliminates the formation of these tiny theoretical gaps. The important fact is that these actions have concentrated the clamping force on sealing surface 50 in very close proximity to bend 23. Similarly, the clamping force on sealing surface 51 has been concentrated in very close proximity to bend 26. The lengthwise rigidity of bends 23 and 35 on opposite sides of sealing surface 50, in close relation to the majority of the clamping force, insures that joint deflection is minimal. Similarly, the lengthwise rigidity of bends 26 and 42 on opposite sides of sealing surface 51, in close relation to the majority of clamping force, insures that joint deflection is minimal. It will also be noted at this time that any pressure generated inside the vertical screw housing does not tend to open the joints. Should internal pressure tend to move the movable section 32 away from the fixed section 20, that same pressure tends to push bends 36 and 41 away from each other, thus maintaining contact at sealing surfaces 50 and 51.

It has been noted that gaps 46, 47, 48 and 49 are all at least partially closed during clamping. FIG. 9 shows gap 47 completely closed and gap 48 partially open less than the thickness of the sheets 21 and 33. Alternatively, either or both gaps 47 and 48 may be essentially closed, or both may be partially open.

Gaps 46 and 49 should never close, thus avoiding unwanted binding forces on the joints. These gaps are minimal size for appearance only, and have no function.

They are present only because the edge flanges of sheets 21 and 33 happen to shape them. They can be many multiples of their illustrated width without affecting the operation of the joints. In fact, the bends at 22, 34 and 27, 43 may be omitted without any bad effect. However, these extra bends add to the stiffness of the joint. They cannot be much narrower without the danger of binding the joint. Thus the outside dimension between bends 22 and 23 must always be at least ½ metal thickness less than the inside dimension between bends 34 and 35. Similarly, the outside dimensions between bends 26 and 27 must always be at least ½ metal thickness less than the inside dimension between bends 42 and 43.

The reasons for the initial gap configurations are these. As the movable section 32 of the screw housing is moved into mating position with the fixed section 20, it is desired to keep the pairs of mating surfaces 50 and 51 in reasonably accurate alignment. The planar surfaces bordering gaps 47 and 48 insure that initial angular misalignment about the center of the housing must be less than 1°, usually less than one-half degree, as in FIG. 8. Then as the housing is fully clamped, the angular mis-alignment must become even less as the movable section 32 wedges into the fixed section 20.

As seen in FIG. 9, when the screw housing 14 is in the closed position, the threaded hole 52 in hinge ear 44 is near one extremity of slot 53 in bottom bearing plate 29. A bolt 52a can now be passed through the slot 53 and threaded into hole 52 to form a hinge pin at the lower end of the assembly. The configuration of the slot 53 is such that at no point will it bear on the hinge pin, thus allowing full freedom for the longitudinal joints to mate. An identical arrangement is used at the top of the vertical screw housing. The hinge pins or bolts 52a are understood to be in place permanently through slots 53 and holes 52.

Figure 10:
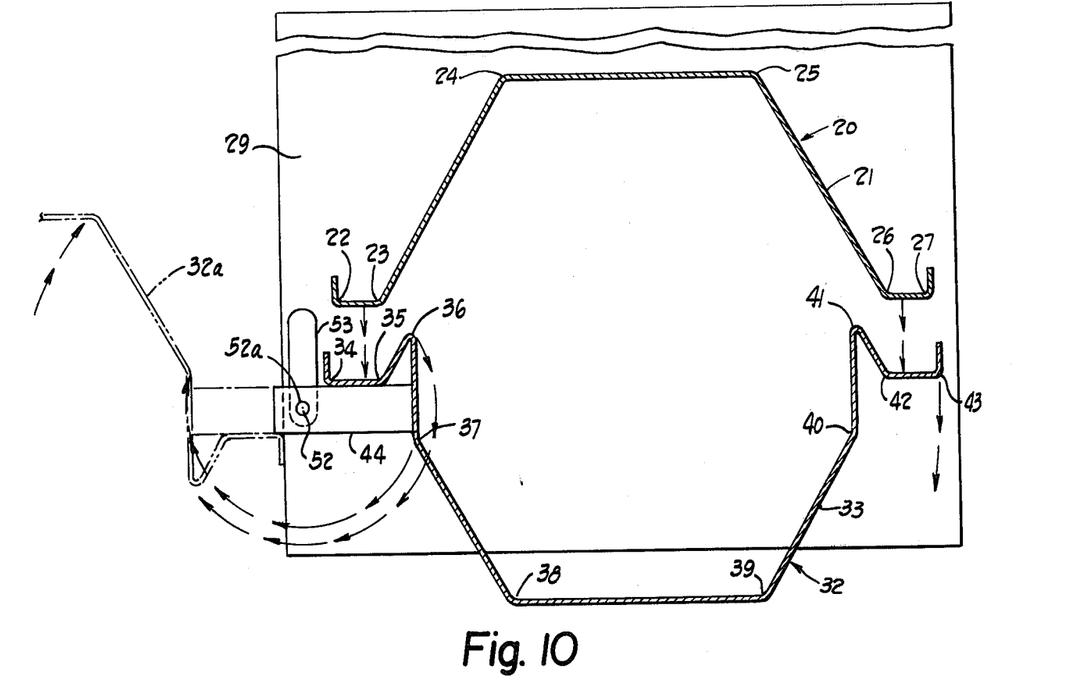
FIG. 10 is the same sectional view as FIG. 8 but with the two housing halves in opened relation, with the movable half section in dot-dash lines swung about a pivot.

FIG. 10 illustrates how the housing may be opened. The movable section 32 is pulled away from the fixed section 20 until the holes 52 are near the outer extremity of the slots 53. At this point, the hinge pins 52a would stop the straight pulling action, and the swinging action can start. When fully open, the movable section 32 would be in the position shown by the dot dash lines at 32a. When the housing is in this open position, all surfaces are visible and accessible for thorough cleaning.

The clamping action previously mentioned, which holes the two housing sections together as in FIG. 9, is quite simple. The multiple longitudinal bends in each housing section 20 and 32 impart considerable lengthwise rigidity to both sections. This rigidity, coupled with the transverse flexibility of the sheets 21 and 33 between bends as previously described, and the wedging action at the planar seal areas 50 and 51, means that very few clamping points are necessary to obtain full length tight joints. Referring to FIG. 2, a toggle type overcenter clamp of a commercially available type fixed to top plate 28 is shown in place at the top of the conveyor housing 14, in clamping position 54. The arm of 54 can be swung to move this clamp to an open position for removal of the movable housing section. The clamp is shown in more than normal size for clarity.

It may be noted that a clamp identical to top clamp 54 could also be used at the bottom of the housing 14. However, it would undesriably project away from the machine and possibly injure the legs of passing personnel or be damaged by passing trucks. Therefore, a commercially available pull type overcenter toggle clamp is used on either side of the housing near the bottom. One of these clamps is evident at 55 in FIG. 2, and shown in the locked position. The hook 55a of the clamp is over clamping pin 45. When the clamp handle is raised in the direction of arrow 55b, tension on hook 55a is released and the hook may be removed from clamp pin 45. Both types of clamps have screw adjustments with lock nuts, so that any desired clamping force may be obtained.

Referring to FIGS. 3, 4 and 5, the purpose of bent strips 30 must be explained. It is obvious that the overall length of movable housing section 32 must be less than the distance between upper and lower bearing plates 28 and 29 on fixed housing section 20, in order that the movable section 32 may move freely. However, the material of movable section 32 is thin sheet metal, so that its edges cannot constitute an effective seal against either bearing plate 28 or 29. Therefore, strips 30 are shaped to telescope into and to closely match the inside configuration of movable section 32 when it is in clamped position against fixed section 20, and then the strips 30 are welded in proper position to the two plates 28 and 29. When movable section 32 is fully clamped to fixed section 20, the strips 30 are then in close relation to the inside of movable section 32, and may actually be touching 32 in places. The small amount of leakage of dry material which may occur at the bottom joint between 30 and 32 soon fills the joint and the leak stops. Leakage at the upper joint between 30 and 32 is never a problem, even when the housing is inclined as much as 45° from the vertical. To have leakage, the conveyed material would have to move, against gravity, upwardly between housing half 32 and bent strip 30. The necessary impetus to achieve this will never be present, because this joint is directly opposite the discharge opening 18, so that upward pressure on the conveyed material is minimized.

It will be noted as illustrated in FIG. 5 that the bent strip 30 is welded only to bearing plate 20 and is not in contact with any other portion of the fixed housing half 20. The gaps 56 and 57 showing in FIG. 5 between the ends of strip 30 and inner face of housing sheet 21 are for water drainage during cleanup, so that no water is trapped behind strip 30. Obviously, water entrapment could not occur where strip 30 is welded to the under side of the top bearing plate 28, but the gaps are there merely so that the strips 30 are identical on both ends of the housing 14. The use of strips similar to 30 is quite common in other similar devices but their use in conjunction with the longitudinal joints of this invention is desirable to maintain end tightness equivalent to longitudinal joint tightness.

Figure 11:
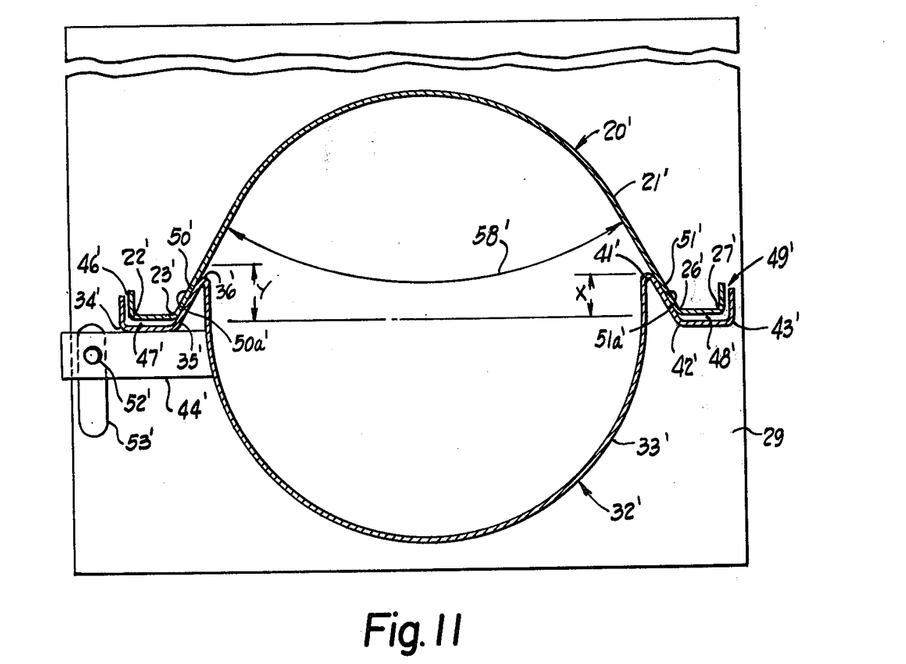
FIG. 11 is a view similar to FIG. 8 but showing a second embodiment of the invention applied to a conveyor housing substantially circular in section.

It has been explained that the housings for most vertical screw conveyors are usually cylindrical, thus circular in cross-section, whereas the housing illustrated in the drawings of the first embodiment is more nearly octagonal in cross-section when closed as in FIG. 9. The circular cross section is more common because pipe or tubing is often available in stock sizes to suit the housing requirements. The octagonal cross-section, and also hexagonal cross-sections, have been used for at least 25 years in instances where the manufacturer could not form a cylindrical shape. The different cross-sections may have some arguable advantages in various ways, but the arguments are not pertinent to this invention. This invention details the longitudinal joints between housing sections only. The balance of the housing cross-section removed from the joints can be almost any conceivable shape. FIG. 11 shows an almost circular section. The phrase "generally cylindrical" in the claims is intended to include the structure of FIG. 11 and the eight sided structure of the first embodiment.

The second embodiment as shown in FIG. 11 is almost circular in section except for the portions bent downwardly and outwardly at the angle 58' to form the sealing portions 50' and 51' which are in approximately the same position and which perform the same function as the sealing surfaces 50 and 51 previously described. This is the fixed half portion of the housing, and is otherwise exactly as described in connection with FIG. 8. The movable half portion of the housing, as shown in FIG. 11, at 32' has a generally planar portion at each terminal edge of the C-shape parallel to the driving axis of the conveyor screw and extending a short predetermined distance beyond the horizontal diameter of the housing as shown in FIG. 11 to the positions 36' and 41'. The sheet is there bent downwardly and outwardly at an acute angle equal to one-half of the angle 58' and extending linearly to approximately the mentioned horizontal diameter. This forms an outer linear sealing surface like that described in connection with the first embodiment. The sheet is then bent radially outwardly at an obtuse angle, on opposite sides of the housing for a short distance. The joint structure could then terminate at the points marked 22', 34', and 27', 43' on FIG. 11. However, preferably the distal ends of the portions of sheet 21' and 33' are there bent up at 90° vertically for a very short distance to provide another stiffening bend in the joint structure.

Otherwise, the structure as shown in FIG. 11 operates in exactly the same way as described in connection with the first embodiment.

It is obvious from the drawings that the joint sealing surfaces 50 and 51 do not lie in the same plane, as do the joint sealing surfaces of common types of openable vertical screw conveyor housings. Referring to FIG. 8, the angle 58 between the planes of surfaces 50 and 51 is about 60°. This angle is not critical, and could be at least 15 degrees more or less, or between 45° and 75°, consistent with fabrication ease and desired housing cross-section. The important feature of angle 58 is that it is preferably an acute angle, which permits the sheet 33 to flex in various places as previously described, thus allowing the sealing surfaces 50 and 51 to self-align for dependable sealing. No such self-alignment or flexing is possible when the joint sealing surfaces are in the same plane, as with common types of openable screw conveyor housings.

FIG. 8 is marked in dot-dash to show that all eight sides of the closed housing are essentially tangent to a common inscribed circle Z. The angle 58 has been defined as being about 60 degrees. If the line 36-37 were extended to intersect the surface 23-24, the point of intersection would be 15 degrees above the horizontal center line in FIG. 8, and the distance Y of this point above the horizontal center line is .25882 times the radius of the inscribed circle Z. Note that angle 36 is one half of angle 58 and the above described angle is one half of 36, thus 15°. If angle 58 were increased the allowable variation of 15°, then angle 36 would be 37½° and the new angle would be 18¾°. The actual location of the sheet metal at angle 36 or 41 above the horizontal center line of FIG. 8 is shown as X, which must be less than Y, which in the described embodiment is 0.25882R. The actual dimension X depends upon metal thickness of sheet 33, of course, but it is also dependent upon the sharpness of the bending die which forms the inside shape of angle 36 or 41.

As further definition of the cross-section of an eight sided housing as in FIG. 8, it will be noted that all eight sides are essentially tangent to a common inscribed circle, Z. Knowing this, any draftsman should easily lay out and dimension the various bends while considering the metal thickness to be used and the sharpness of the bending die equipment available. Similarly, in the configuration of FIG. 11, which illustrates a nominally cylindrical housing modified in the seal areas, the radius of the cylinder and the angle 58' define the seal areas 50' and 51' sufficiently to lay out and dimension the bends for any given metal thickness and bending equipment.

A further advantage of this invention over the common configuration of mating coplanar radial flanges may be seen by study of FIG. 9. In FIG. 9, the sealing surfaces 50 and 51 are each protected from distortion due to mechanical damage by two additional flanges bent at 22, 23, and at 26, 27. Obviously, the seal surfaces of FIG. 9 will be dependably true for a longer period of time than the above described common configuration, when both are used in comparable service.

A final advantage of this invention over the commonly used configurations is not obvious. Whereas, in certain applications, the commonly used configurations would require metal thikcness of 14 gage for sheets 21 and 33 as defined by Manufacturer's Standard Gage for Sheet Steel, the configuration of FIG. 9 in the same applications requires only 16 gage for sheet 33. Thus, while the material required to fabricate sheet 33 in FIG. 9 is wider than that for the commonly used configurations, the weight remains about the same because the wider sheet is thinner. A stronger, tighter joint is obtained with the same weight of metal, a portion being of lesser thickness which is easier to fabricate.

It may now be fully understood that the objectives of this invention have all been attained. This longitudinal joint for a vertical screw conveyor is simple, in that it can be formed with simple common sheet metal bending techniques. It is economical in that it incorporates light weight metal, and the fewer clamping points than most such joints, results in much less welding in this invention. The joint is rugged, in that it is well protected from accidental or normal use deformation by multiple flanges outside the sealing area. It is reliable because it is rugged and is not deformed by welding. It is sanitary because there are no tight crevices to make cleaning difficult. It is exceptionally tight because of the concentration of clamping force as described in the discussion of FIG. 9.

Some of the possible variations in the design of the joints have been discussed previously. The angle 58 in FIG. 8 could be increased or decreased by at least 15° and possibly more without greatly affecting the action at the joints. The shape of the housing beyond the extemities of the sealing surfaces 59 and 51 in FIG. 9 could be almost any shape desired, as seen in FIG. 11. Floating hinge arrangements on one side of the joint could be completely different, or the hinge could be eliminated to make the removable section completely loose. The clamp positions could be changed, their sizes increased or decreased or their number increased. One could use C-clamps (top and bottom) in place of toggle over-center clamps 54 and 55. None of these changes would detract from this invention.

The screw housing joint described is not limited in application to food machinery or to vertical screws. Any application for screw conveyors which requires a leak resistant openable housing might benefit from its use.

What is claimed is:

1. A generally vertical joint structure extending longitudinally of a housing enclosing a generally vertical screw conveyor having an axial driving shaft forming part of a larger machine; comprising a generally cylindrical housing composed of two hollow half portions, each generally C-shape in section; said half portions assembled with their open sides mutually meeting and joining along two longitudinal zones diametrically opposite in said housing and parallel to the axis of said conveyor shaft to form generally a cylinder whose axis coincides with said shaft axis; means closing the open top and bottom of said housing; said housing half portions consisting of formed sheet material; there being openings in said housing near the top and bottom thereof for inlet and outlet of material moved by said conveyor and said housing being otherwise imperforate; each of said longitudinal joints comprising, in a first of said half portions, a generally planar portion, at each terminal edge of said C-shape, parallel to said axis and extending a short predetermined distance beyond and essentially perpendicular to a diameter of said housing and there bent downwardly and outwardly at an acute angle extending linearly to approximately said diameter, thus forming a first linear sealing surface, and there bent radially outwardly at an obtuse angle for a short distance; each of said longitudinal joints, in a second of said half portions, comprising at each terminal edge of said C-shape a linear portion extending at said abovementioned acute angle to a zone approximately on said diameter outside of said first linear sealing surface, thus forming a second linear sealing surface, and there bent radially outwardly at an obtuse angle for a short distance; said bends in said housing half portion stiffening said terminal edges of said C-shapes; and means for clamping said housing half portions which said first and second sealing surfaces tight together.

2. The joint structure as defined in claim 1, wherein said second housing half portion is fixed to said machine; and said first housing half portion has a hinge connection with said machine permitting movement of said first half portion substantially linearly away from said second half portion for said predetermined distance and then pivotally around said hinge connection.

3. The joint structure as defined in claim 1, wherein said formed sheet material is stainless steel.

4. The joint structure as defined in claim 1, wherein said generally cylindrical housing is substantially an irregular octagon with five of its linear sides in said first housing portion and three of its linear sides in said second housing portion.

5. The joint structure as defined in claim 1, wherein said generally cylindrical housing is substantially a true cylinder, circular in section, except for said terminal edges of said C-shapes.

6. The joint structure as defined in claim 1, wherein said means closing the open top and bottom of said housing includes at each end a flat plate extending across the end and a short piece telescoping closely inside said first half portion of said housing and confroming to said first half portion shape up to, but not including, said acute bends; and said short piece welded to each of said flat plates.

7. The joint structure as defined in claim 1, including a right angle bend in each housing half portion, at each end of each C-shape, after each radial bend outwardly at an obtuse angle, for a short distance, whereby to further stiffen each terminal edge of each C-shape.

8. The joint structure as defined in claim 4, wherein said predetermined distance, which said generally planar portion of each terminal edge of each C-shape part of said first half portion extends beyond a diameter of said housing, is more than one-half and less than three-quarters of the distance said planar portion would be beyond said diameter if extended to engage the adjacent linear side of said second half portion.

* * * * *